United States Patent [19]
Goodyear et al.

[11] 3,887,411
[45] June 3, 1975

[54] MAKING A TRIPLE DENSITY ARTICLE OF SILICON NITRIDE

[75] Inventors: Michael U. Goodyear, Plymouth; Andre Ezis, Gross Ile; Karsten H. Styhr, Farmington, all of Mich.

[73] Assignee: Ford Motor Company, Dearborn, Mich.

[22] Filed: Dec. 20, 1973

[21] Appl. No.: 426,832

[52] U.S. Cl. ............ 156/89; 117/DIG. 12; 156/155; 156/242; 264/58; 264/60; 264/65; 264/66; 416/241
[51] Int. Cl. ............................................ C04b 39/12
[58] Field of Search ............. 156/89, 155, 288, 311, 156/242; 264/56, 57, 58, 60, 65, 62, 66, 328, 332; 117/DIG. 12, 169 A; 75/226, 221, 214; 416/229, 241, 241 B; 29/156.8 R, 156.8 B, 156.8 CF, 156.8 T

[56] References Cited
UNITED STATES PATENTS

| | | | |
|---|---|---|---|
| 2,618,565 | 11/1952 | Nicholson | 117/DIG. 12 |
| 3,505,158 | 4/1970 | Murray | 264/60 |
| 3,533,905 | 10/1970 | O'Meara | 264/332 |
| 3,725,186 | 4/1973 | Lynch | 156/89 |
| 3,767,748 | 10/1973 | Rosette | 264/332 |

FOREIGN PATENTS OR APPLICATIONS

| | | | |
|---|---|---|---|
| 694,170 | 7/1953 | United Kingdom | 416/241 B |
| 779,474 | 7/1957 | United Kingdom | 416/241 B |
| 568,458 | 1/1959 | Canada | 416/241 B |

OTHER PUBLICATIONS

Biasi–"2500°F Target for Vehicular Ceramic Turbine" Gas Turbine World Oct.–Nov. 1972, Vol. 2, No. 4. pp. 12–19.

"2500°F Target for 30–MW Ceramics Test Turbine" Gas Turbine World, Aug 1972, Vol. 2, No. 3, pp. 34–40.

Gill et al., – "Self Bonded Silicon Nitride" – Refractories Journal – March, 1962, pp. 92–96.

Popper et al., – "The Preparation, Props. and Struct. of Silicon Nitride" – Trans. of Brit. Cer. Soc. Vol. 60, Sept. 1961, pp. 603–623.

*Primary Examiner*—Charles E. Van Horn
*Assistant Examiner*—F. Frisenda
*Attorney, Agent, or Firm*—William E. Johnson; Keith L. Zerschling

[57] ABSTRACT

A method of making a triple density article of silicon nitride is disclosed. A first element is formed by hot pressing silicon nitride particles. The general shape of a second element is formed by injection molding silicon metal particles and a binder and subsequently burning out the binder. The general shape of a third element is slip cast. The slip cast element is sintered to give it some strength. The third element is then bonded to at least a portion of the second element in a slip casting operation. The so combined second and third elements are nitrided in a nitriding operation. Facing surface areas of the first element and the third element are bonded together by applying heat on both elements and pressure to one of the elements while the other element is held in a fixed position.

7 Claims, No Drawings

MAKING A TRIPLE DENSITY ARTICLE OF SILICON NITRIDE

This application results from development work carried on for the Department of the Army under Contract No. DAAG-46-71-C0162.

BACKGROUND OF THE INVENTION

Silicon nitride has a wide variety of uses based on its physical and chemical properties. These uses, to name a few, include thermocouple protection tubes, crucibles for foundry use, substrates for electronic applications and structural components for gas turbine engines.

Silicon nitride can be produced by a number of different processing techniques with each technique yielding a different final density. Each technique also has a definite restriction on the final shape which may be produced. Simple shapes of better than 98% theoretical density can be made by hot pressing silicon nitride powder to form the final article. Complex shapes, however, generally cannot be manufactured by this processing technique.

Another processing technique for manufacturing fairly intricate shapes of silicon nitride is slip casting. A slip casting technique generally produces a final article having a density in the range from 80 to 85% of theoretical density. In the slip casting technique, silicon metal particles are cast into the desired shape. The silicon metal is then converted, in a nitriding operation, into silicon nitride.

As an alternate to the above two techniques, silicon nitride articles of complex shape, having densities of 70 to 75% of theoretical density are produced by an injection molding technique. In this technique, silicon metal particles and a thermoplastic are formed into a mixture. This mixture is injection molded to form the shape of the article. Subsequent operations include the heating of the article to burn out the thermoplastic and a nitriding operation to produce the final silicon nitride article.

It is generally impossible to fabricate a complete rotor for a gas turbine engine of hot pressed, silicon nitride material. The impossibility of manufacutring such a complete rotor by a hot pressing technique comes about because of the complex shape of the rotor blades. The complex shape of such blades can be formed easily by an injection molding technique. It is impossible, however, to form a complete rotor by an injection moding technique or by a slip casting technique as the hub portion of the rotor formed by either of these two techniques cannot withstand the mechanical and the thermal stresses imposed on that portion of the rotor during use in an engine.

This invention teaches a method wherein the best characteristics of hot pressed, slip cast and injection molded silicon nitride materials are brought together to form a complex article of manufacture such as a rotor for a gas turbine engine. All of the structure is bonded together by strong and uniform bonds at junctions between the different materials.

SUMMARY OF THE INVENTION

This invention is directed to a method of making an article of silicon nitride and, more particularly, to a method of making a triple density article of silicon nitride. The method has the following general steps.

A first element of silicon nitride is formed in a hot pressing operation. In this operation, substantially pure silicon nitride particles are compacted to at least about 98% of theoretical density. The compacting of the silicon nitride occurs by applying both heat and pressure to a mixture of silicon nitride particles and a densification aid.

A second element has its general shape formed by injection molding silicon metal particles and a carrier, such as a thermoplastic, into a mold. The so molded article is heated to burn out the carrier.

The general shape of the third element is formed in a slip casting operation. The operation is carried out by use of a slip containing silicon metal particles suspended in a vehicle. After its formation, the third element is sintered in an atmosphere formed by a gas which will not react with the silicon metal particles.

A surface area of the third element is positioned adjacent at least a portion of the surface area of the second element in a manner such that a small space exists between at least a portion of the two elements. The third and second elements are then bonded together in a slip casting operation. In this operation a slip containing silicon metal particles suspended in a vehicle is applied to the space existing between the two elements.

The second and third elements are nitrided in a single operation so that both of the elements are converted substantially to pure silicon nitride. By nitriding the two elements in a single operation, the two elements are joined to one another by a strong and permanent chemical bond at the interfacial zone of slip casting contact.

A surface area on the first element is brought into close association with a surface area on the third element. The two areas are held in close association with one another. A bond is formed between the associated surfaces of the first and the third elements by applying heat on both elements and pressure on one of the elements while the other of the elements is held in a fixed position. This application of heat and pressure forces a portion of the silicon nitride forming the surface area of the one element into bonding relationship with the silicon nitride forming the surface area of the other element whereby a uniform and a strong bond is formed between the first and third elements thereby uniting all three of the elements into a single article having three sections of different density.

DESCRIPTION OF THE PREFERRED EMBODIMENT

A process for making a triple density article of silicon nitride material will be described. The article to be described will be a rotor for a gas turbine engine. The first element of the rotor is its central hub. The second element of the rotor is the outer blade ring of complex shape over which the hot gases of the engine flow to turn the rotor. The third element is a transitional portion between the hub and the blade ring.

The method of making a triple density article of silicon nitride in accordance with the general teachings of this invention is initiated by forming a first element which, in this case, is the hub of the rotor. The first element is formed by compacting a mixture consisting of from about 95 to 99.5% by weight of silicon nitride particles and from about 5 to 0.5% by weight of a densification aid. This mixture is compacted to a density of at least 98% theoretical density. The compacting of the mixture is carried out by applying heat and pressure to the mixture, thereby forcing it into a compact form.

In general, the silicon nitride use in the compacting operation is alpha silicon nitride powder. The powder is generally a ceramic grade and is preferably all minus 325 mesh. The silicon nitride powder is wet ball milled in a rubber lined mill with alumina or tungsten carbide balls and alcohol for a time ranging from one day to two weeks. A densification aid, such as magnesium oxide or any other suitable material, is mixed thoroughly with the silicon mitride powder during the milling operation. Concentrations of the densification aid are generally in the range from about 0.5 to 5.0 weight percent. The aid helps in the powder compaction process. After milling, the silicon nitride powder slurry is dried and screened through a 100 mesh screen for hot pressing.

The hub or first element is hot pressed to the approximate final dimensions and contours in a graphite die system. Barrier materials are coated on the graphite die to minimize any reaction between the powder and the die system. The barrier material commonly used is graphite foil. The silicon nitride material is hot pressed at a temperature from about 1,650°C to about 1,800°C and at a pressure of from about 3,000 psi to about 4,000 psi. The pressing operation takes place for a time from one to three hours. The final article produced by this method is the first element of hot pressed silicon nitride material. The material has a density in excess of 98% theoretical and is extremely strong. The material readily withstands both the temperature and the stress load imposed when it is used as the hub portion of a turbine rotor.

The general shape of the second element, which in this case is the turbine blade ring of complex configuration, is injection molded as a single unit. The blade ring has individual blades extending radially outwardly from a ring interconnecting all the blades. The interconnecting ring has an inwardly facing circumferential surface. A typical molding compound for forming the second element is one in which the silicon metal particles comprise about 60 to 66% of its volume with the remainder being a thermoplastic binder. In general, the particle size of the metal will be such that the material will have a maximum particle size in the range of 40 to 60 microns and a mean particle size in the range from 10 to 13 microns. Once a molding composition is formed, the composition is fed into a cylinder of an injection molding machine. The machine heats the thermoplastic above its melting point. Pressure is applied to the cylinder and the molding composition is shot into a cold molding die having the configuration of the blade ring to be produced. The thermoplastic solidifies into the desired shape thereby locking the silicon metal particles carried along with it into the desired shape.

The so formed blade ring of silicon metal and thermoplastic is then gradually heated in a furnace to a temperature of about 350°C. The heating program may take as long as three days so that no stresses are created in the article during heating. During this heating, the thermoplastic binder is burned out. This action leaves behind silicon metal in the desired shape of the blade ring.

The general shape of the third element is formed in a slip casting operation. The shape is a ring, the outer diameter of which is approximately equal to the diameter of the inwardly facing circumferential surface of the second element. The outer surface is formed with an inward taper of 1° to 3° from top to bottom so that when it is placed adjacent the second element, there is a wedge shape opening therebetween, the purpose of which will be described below. The inner diameter of the third element is about equal to the outer diameter of the first element.

The third element is formed by pouring a slip of silicon metal particles in a vehicle into a mold which is the negative of the shape desired. The mold is porous to draw out the vehicle thereby leaving behind silicon metal particles in the shape desired. Full details of slip casting techniques are set forth in U.S. Patent Application Ser. No. 415,898, entitled "Process for Making a Silicon Nitride Article" filed on Nov. 14, 1973 and assigned to the same assignee as this application. That application is hereby incorporated into this application by reference.

After the shape of the third element has been formed, the element is sintered so that it has sufficient strength for handling. The sintering takes place in a gaseous atmosphere, such as argon, which does not cause the formation of a second phase in the silicon metal particles. The sintering operation may take place at a temperature in the range of 980°C to 1,180°C and for a period of time from 5 minutes to 12 hours.

After the sintering of the third element, the outside surface thereof is machined to final dimension and placed adjacent a machined, inwardly facing surface of the second element. As pointed out above, a wedge shape opening is left between these two surfaces. The two surfaces are wet with water and the wedge shape opening is filled, around its entire circumference, with a silicon metal slip such as used in forming the third element, if desired. Since the second and third elements are porous, they act to draw the vehilce out of the slip thereby leaving behind the silicon metal particles of the slip. This casting operation forms a temporary bond between the two elements which is transferred into a strong and permanent bond in a nitriding operation.

The joined elements are subjected to a nitriding operation. Since both elements are formed of pure silicon particles, the nitriding operation is effective to change both elements into silicon nitride. In the nitriding operation the elements are heated while exposed to nitrogen gas at temperatures and for sufficient periods of time that all of the silicon is transformed into silicon nitride.

A full procedure for nitriding silicon to form silicon nitride is disclosed in U.S. Patent Application Ser. No. 411,599, filed Oct. 30, 1973 entitled "Improved Process for Making Silicon Nitride Articles", which application is assigned to the same assignee as this application. This application also is hereby incorporated by reference. In the nitriding operation, the injection molded silicon is converted into silicon nitride having a density of 70 to 75% of theoretical density whereas the slip cast portion of the silicon is transformed into a silicon nitride material having a density of about 80 to 85% of theoretical density. The bond formed between the second and the third elements in the nitriding operation is able to withstand the extreme temperatures and stresses that are normally encountered in the operation of a turbine engine.

The first element is bonded to the already joined second and third elements in the following manner. The first element, namely the hot pressed hub, has an outer circumferential surface which is brought into engagement with an inwardly facing circumferential surface of the third element of the now joined third and second elements. The surface areas which are brought into close association may be machined on each of the elements so that proper sizing is obtained. The associated elements are placed in a pressing die and heat and pressure are applied thereto while the joined second and third elements are supported to resist the pressure. The pressure applied on the central hub or first element is from at least about 1,000 lbs. per square inch to about 3,500 lbs. per square inch while the elements are maintained at a temperature in the range from 1,625°C to about 1,700°C for a time of at least 1.5 hours. During this hot pressing operation, a bond is formed between the associated surfaces of the first and third elements as the silicon nitride of both surfaces tends to migrate into the other surface thereby forming a uniform and strong bond therebetween.

The so completed article is thereby formed of silicon nitride material having three different densities. The central portion of the formed article is hot pressed silicon nitride of high density. A transitional zone between the hub and the outer ring blade is formed of a slip cast silicon nitride material having a moderately high density. The complex turbine blades themselves are formed from injection molded material which produce a silicon nitride material of less than theoretical density. All three of the differently formed silicon nitride materials are uniformly bonded to one another to produce the final article which exhibits all the strength and temperature resistant characteristics for which silicon nitride is known.

There has been disclosed herein a new method of making a triple density article of silicon nitride material. In view of the teachings of this specification, those skilled in the art will be led to make modifications of this invention. It is intended that all modifications which fall within the spirit and scope of this invention be included within the appended claims.

We claim:

1. A method of making a triple density article of silicon nitride which comprises the steps of:

compacting a mixture consisting of from about 95 to 99.5% by weight silicon nitride particles and from about 5 to 0.5% by weight of a densification aid to at least 98% of theoretical density by use of heat and pressure thereby to form a first element of silicon nitride;

forming the general shape of a second element by (a) injection molding silicon metal particles and a carrier to form the general shape of said second element, and (b) heating said second element to burn out said carrier;

forming the general shape of a third element by a slip casting operation, said slip casting being accomplished from a slip containing silicon metal particles suspended in a vehicle;

sintering said third element in an inert atmosphere for a time and at a temperature sufficient to increase the strength of said third element, the inert atmosphere being formed of a gas which will not react with the silicon metal particles;

positioning said third element adjacent at least a portion of the surface area of said second element in a manner such that a small space exists between at least a portion of said two elements;

bonding said second element to said third element by a slip casting operation in which a slip containing silicon metal particles suspended in a vehicle is applied to said space existing between said two elements to build up silicon metal particles in said space;

nitriding said bonded second and said third elements in a single operation so that both of said elements are converted substantially to pure silicon nitride and are joined to one another at the area of the slip cast bonding operation;

bringing a surface area of said first element into close association with a surface area of said third element;

holding said associated surfaces of said first and said third elements so they do not move with respect to one another; and forming a bond between said associated surfaces of said first and said third elements by applying heat to both elements and pressure on one of said elements while the other of said elements is held thereby to force a portion of the silicon nitride forming said surface area of said one element into bonding relationship with said surface area of the other element.

2. The method of claim 1 wherein: said first element is the one element to which pressure is applied to force its surface area into bonding relationship with said surface area of said third element.

3. The method of claim 1 wherein: said densification aid is magnesium oxide.

4. The method of claim 1 wherein: said compacting operation takes place at a temperature from of about 1,650°C to about 1,800°C at a pressure of from at least 3,000 psi and for a time of at least 1.5 hours.

5. The method of claim 1 wherein: said bond forming operation takes place at a temperature of from about 1,625°C to about 1,700°C at a pressure of at least 1,000 psi and for a time of at least 1.5 hours.

6. The method of claim 1 wherein: said suitable carrier used in the formation of said second element is a thermoplastic resin.

7. The method of claim 1 wherein: said sintering operation is carried out in an argon gas atmosphere, and wherein the sintering temperature is in a range from 980°C to 1,180°C and the sintering time is for a period of from 5 minutes to 12 hours.

* * * * *